United States Patent [19]

Asano et al.

[11] Patent Number: 5,086,663
[45] Date of Patent: Feb. 11, 1992

[54] ADJUSTABLE PEDAL

[75] Inventors: Yasushi Asano; Yoshimasa Kataumi, both of Shizuoka, Japan

[73] Assignee: Fuji Kiko Company, Limited, Tokyo, Japan

[21] Appl. No.: 558,510

[22] Filed: Jul. 27, 1990

[30] Foreign Application Priority Data

Jul. 28, 1989 [JP] Japan ................. 1-88788[U]
Jul. 28, 1989 [JP] Japan ................. 1-88789[U]

[51] Int. Cl.$^5$ .............................. G05G 1/14
[52] U.S. Cl. ............................. 74/512; 74/513
[58] Field of Search ............. 74/512, 513, 560, 522, 74/514, 515 R; 192/3 R

[56] References Cited

U.S. PATENT DOCUMENTS

| 3,151,499 | 10/1964 | Roe | 74/560 |
| 3,563,111 | 2/1971 | Zeigler | 74/512 |
| 3,643,524 | 2/1972 | Herring | 74/512 |
| 3,828,625 | 8/1974 | Bruhn | 74/512 |
| 4,870,871 | 10/1989 | Ivan | 74/513 |
| 4,875,385 | 10/1989 | Sitrin | 74/512 |

FOREIGN PATENT DOCUMENTS

| 0256466 | 2/1988 | European Pat. Off. | 74/512 |
| 0353958 | 2/1990 | European Pat. Off. | 74/512 |
| 50-66694 | 3/1975 | Japan | 74/512 |
| 50-34814 | 11/1975 | Japan | 74/512 |

Primary Examiner—Vinh T. Luong
Attorney, Agent, or Firm—Ronald P. Kananen

[57] ABSTRACT

An adjustable pedal for a vehicle includes a bracket for mounting the pedal on a vehicle body, a holder pivotably supported by the bracket, and a pedal member, an end of which is adjustably attached to the holder to set a position thereof of interest to a driver. The pedal member is pivotable with respect to the bracket in cooperation with the holder and is connected to an operating rod for a vehicle control component to be operated by motion of the pedal member through a linkage. This linkage is adapted for transmit a operating force created by the motion of the pedal member to the operating rod uniformly independent of the position of the pedal member relative to the holder.

6 Claims, 7 Drawing Sheets

5,086,663

ADJUSTABLE PEDAL

BACKGROUND OF THE INVENTION

1. Technical Field

The present invention relates generally to an adjustable pedal. In particular, the invention relates to an adjustable pedal for such as a vehicle, for example, a brake pedal. More particularly, the invention relates to a pedal structure which is positionally adjustable to provide optimum driving comfort to a particular driver.

2. Background Art

Automotive vehicles are normally provided with pedals for controlling acceleration, braking, and/or clutch operations. Automotive pedals typically include a pedal arm which is pivotably supported by a bracket installed in a floor-panel of a vehicle body, an operating rod or an operating wire which connects the accelerator, brake, or clutch to the pedal arm, and a pedal pad which is attached to the free end of the pedal arm as an operating surface. Acceleration, braking, or clutch operation is accomplished by stepping on the pedal pad to push the operating rod or to pull the operating wire.

Adjustment of the position of the pedal is necessary to obtain the best driving position because of differences in height among individuals. This adjustment is conventionally implemented by sliding a driver's seat forward or backward to set a clearance between the pedal and the driver's foot to be suitable for the individual. However, sliding the seat backward causes the leg space available for passengers occupying a rear seat to be narrowed, causing discomfort for the rear passenger. Additionally, sliding the driver's seat causes a view point of the driver to vary, resulting in undesirable differences in fields of vision among individuals when driving.

For avoiding the above drawbacks, an adjustable pedal for adjusting a relative position thereof in the longitudinal direction of the vehicle is well known in the art. Such structures are disclosed in Japanese Patent Second Publications Nos. 50-6694 and 50-34814, U.S. Pat. No. 3,151,499 filed on Nov. 13, 1962, entitled "ADJUSTABLE PEDAL FOR VEHICLE" by Ronald W. Roe, and U.S. Pat. No. 3,563,111 filed on July 24, 1968, entitled "ADJUSTABLE CONTROL PEDALS" by Phillip B. Zeigler.

However, structure of pedals shown in the above references are complex, resulting in high manufacturing costs. Additionally, there are problems of maintenance unsuitable for practical use.

SUMMARY OF THE INVENTION

It is accordingly one object of the present invention to avoid the disadvantages of the prior art.

It is another object of the invention to provide an adjustable pedal for a vehicle for relative position thereof to obtain the best driving position.

According to one aspect of the present invention, there is provided a structure of a pedal for a vehicle which comprises a pedal member, a pedal holder for supporting the pedal member, a mounting means for pivotably mounting the pedal holder on a vehicle body so as to allow motion of the pedal member along with the pedal holder, a pedal motion output member connected to a vehicle control mechanism to be operated by the motion of the pedal member, an adjusting means for performing adjusting movement for selectively positioning the pedal member on the holder to adjust a position thereof relative to a vehicle operator, and a linkage means connecting the holder and the pedal motion output member, the linkage means operating the pedal motion output member according to the motion of the pedal member to transmit an operating force to the vehicle control mechanism uniformly irrespective of the position of the pedal member relative to the holder.

According to another aspect of the invention, there is provided a structure of a pedal for a vehicle which comprises a pedal member, a pedal holder for supporting the pedal member, a mounting means for pivotably mounting the pedal holder at a first pivot so as to allow the pedal member motion in a control direction along with the pedal holder, an adjusting means including a path of travel for performing adjusting movement of the pedal member for positioning the pedal member on the pedal holder, an operating member connected to a vehicle control component to be operated by the motion of the pedal member in the control direction, and a linkage means for coupling the pedal member and the operating member to transmit an operating force, created by the motion of the pedal member, to the operating member uniformly, irrespective of the position of the pedal member on the path of travel.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENT

Figure 1:
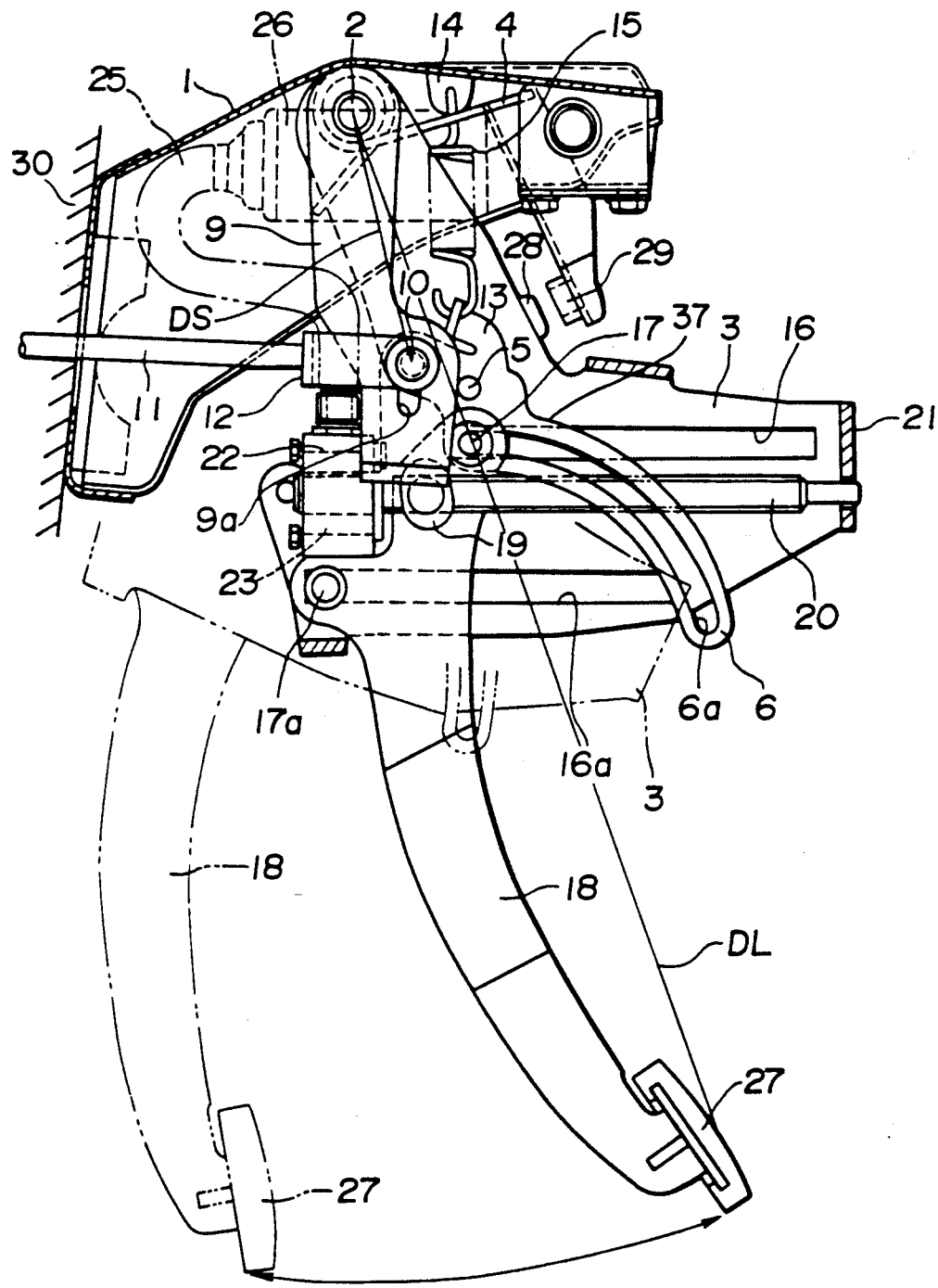
FIG. 1 is a cross sectional view taken through line 1—1 of FIG. 2 showing the brake pedal in an adjusted position in solid lines and in another adjusted position in broken lines which shows an adjustable pedal according to the present invention.
Figure 2:
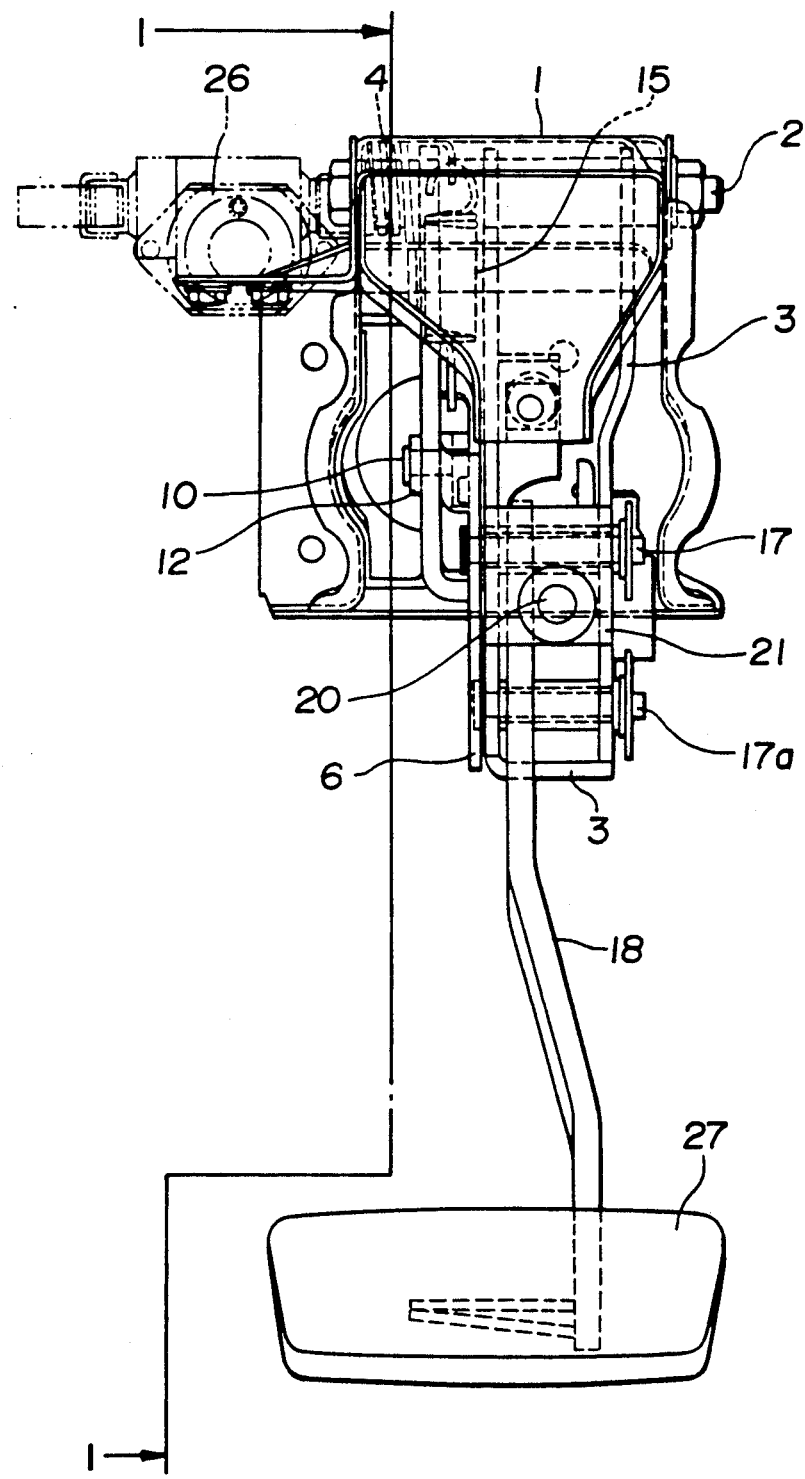
FIG. 2 is a front view of an adjustable pedal according to the present invention.

Referring now to the drawings, particularly to FIGS. 1 and 2, a brake pedal according to the present invention is shown. This brake pedal includes generally a substantially L-shaped holder 3, an adjusting lever 6, a movable lever 9, a pedal arm 18, and a pedal pad 27 attached to a lower end of the pedal arm. The holder 3 is pivotably supported by a bracket 1 installed on a stationary position 30 of a vehicle body such as a dash panel through a shaft 2. A torsion spring or a return spring 4 is wound around the shaft 2 to bias the holder 3 toward an initial position to return to the initial position when the pedal pad 27 is not being depressed. Stoppers 28 and 29 are attached to the holder 3 and the bracket 1 respectively to restrict overrotation of the holder when a driver's foot is suddenly released from the pedal pad 27. The adjusting lever 6 is supported by the holder 3 rotatably about a shaft 5 and includes an arcuated extending portion 37 in which a curved elongated opening 6a is formed. The movable lever 9 includes an elongated opening 9a into which a shaft 10 fixed on the adjusting lever 6 is inserted to be coupled to the adjusting lever. An operating rod or member 11 is pivotably connected to the movable lever 9 at its end 12 through the shaft 10. The holder 3 includes openings 16 and 16a which laterally extend parallel to each other with a given interval. The pedal arm 18 has pins 17 and 17a which engage the openings 16 and 16a of the holder slidably in a lateral direction so as to allow the pedal arm to move along the openings. Additionally, the upper pin 17 is inserted into the curved opening 6a of the adjusting lever 6 to rotate the adjusting lever according to the movement of the pedal arm 18.

The orientation of the curved opening 6a of the adjusting lever 6 is not constant in that, if the pedal pad 27 is moved horizontally with a variation in a distance DL between the shaft 2 and the center point of the pedal pad 27, a distance DS between the shafts 2 and 10 varies proportionally to the variation in the distance DL. It will be appreciated that ratio of variations in the distance DS to the distance DL is constant relative to the horizontal movement of the pedal pad 27 to provide a uniform force acting on the operating rod 11 independent of the position of the pedal arm relative the holder.

A spring 15 is provided between a hook or extending portion 13 which is a part of the adjusting lever 6 and a hook portion 14 which is a part of the bracket 1. The spring 15 serves to retain the gravity of the holder 3 at a preselected position. A screw nut 19 is installed on the pedal arm 18. A screw rod 20 engaging the screw nut 19 is rotatably supported between a rear wall 21 of the holder 3 and a gear housing 22 installed on a front portion of the holder. The gear housing 22 accommodates a worm-wheel which is attached to an end of the screw rod 20. A worm 24 meshes with the worm-wheel 23 and a drive means or motor unit 26 is connected to the worm 24 through a flexible shaft 25. A motor unit 26 is disposed on the outside of the bracket 1 and is energized in response to a switching operation in normal or reverse directions, outputting torque to the screw rod 20 to adjust the pedal arm 18 position.

In operation, the pedal arm 18 is usually located at a position as shown by a solid line in FIG. 1 with the pins 17 and 17a being positioned at the extreme left end of the openings 16 and 16a respectively. The pin 17 is also located at the extreme left end of the curved opening 6a of the adjusting lever 6. With this arrangement, depressing the pedal pad 27 causes the pedal arm 18 to rotate in a clockwise direction with respect to the shaft 2 together with the holder 3 as shown by a broken line. This movement causes the operating rod 11 to be urged toward the left side. On the other hand, releasing the pedal pad 27 causes the pedal arm 18 to be returned to the initial position together with the holder 3 due to the tensioning force exerted by the return spring 4.

Figure 3:
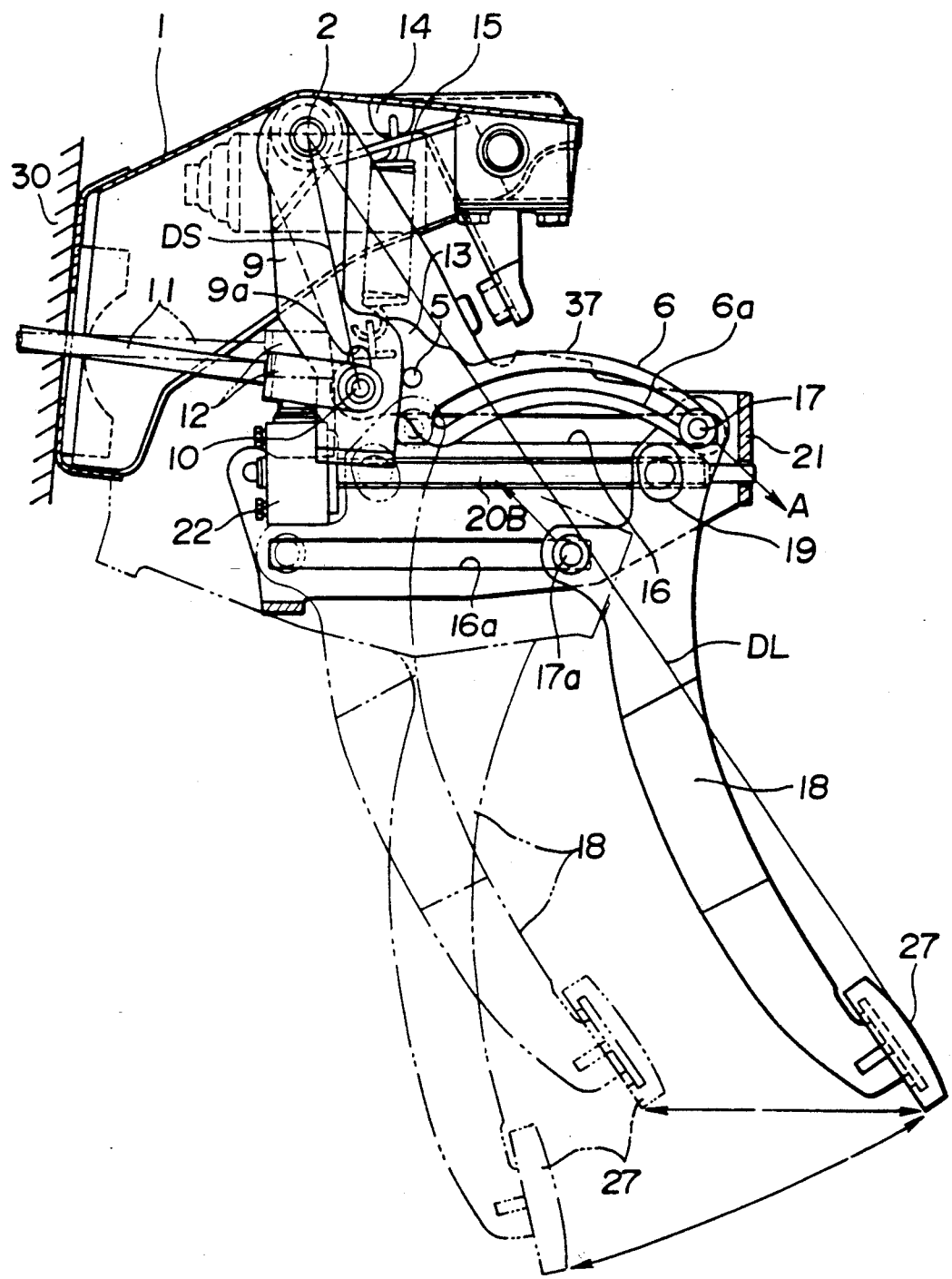
FIG. 3 is a cross sectional view similar to FIG. 1 which shows an adjustment control operation of an adjustable pedal of the invention in an adjusted position in solid lines and two other adjusted positions in broken lines.

Referring to FIG. 3, examples of adjustable positions of the pedal pad 27 relative to a driver's foot are shown. For adjusting the initial position of the pedal pad 27 horizontally from the initial position as shown in FIG. 1, a switch (not shown) is first operated to drive the motor unit 26 in the normal direction. The rotation of the motor unit causes the screw rod 20 to rotate, thereby causing the screw nut 19 to travel horizontally along the openings 16 and 16a. This movement of the screw nut 19 causes the pins 17 and 17a to travel toward the right side with the adjusting lever 6 rotating in the counterclockwise direction according to the movement of the pin 17. Additionally, with the rotation of the adjusting lever 6 about the shaft 5, the shaft 10 travels downward within the elongated opening 9a of the movable lever 9. Thus, the distance DS between the shaft 2 and the shaft 10 varies proportionally to the distance DL between the shaft 2 and the center of the pedal pad 27 with the constant ratio of the variation in the distance DS to that in the distance DL. In other words, if the pin 17 is located at any position along the curved opening 6a, the leverage of the pedal arm 18 is a constant because the variation in distance DS depends on the variation in the distance DL.

The tension spring 15 acts on the adjusting lever 6 according to the movement of the pin 17. The tensioning force caused by the spring 15 serves to support the weight of the holder 3, the adjusting lever 6, and the pedal arm 18 so as to cancel the load exerted by the return spring 4 to keep the holder 3 in place. This results in a constant spring force acting on the pedal arm.

Therefore, after adjusting the horizontal position of the pedal pad 27, depressing the pedal pad 27 causes the pedal arm 18 to rotate, as shown by a broken line in FIG. 3, with respect to the shaft 2 together with the holder 3 in the clockwise direction. This rotation causes the movable lever to rotate in the same direction to push the operating rod 11 toward the left side in the drawing. During rotation of the pedal arm 18 about the shaft 2, vectors A and B acting from the pins 17 and 17a to the openings 16 and 16a respectively are directed in opposite directions to cancel each other and thus the pins 17 and 17a do not slide along the openings 16 and 16a. Further, there is no rotational force acting on the pedal arm 18 about either of the pins 17 or 17a.

It will be noted that the rotational operation of the holder 3 together with the pedal arm 18 is essentially the same as that in the initial position or the extreme left side position. The force transmitted to the operating rod 11 is a constant independent of the positioning arrangement of the pedal arm.

When the pedal pad 17 is released, the pedal arm 18 rotates about the shaft 2 in the counterclockwise direction with the holder 3 to be returned to its initial position as indicated by a solid line in the drawing.

Returning the pedal arm toward the original position as indicated by a solid line in FIG. 1 is accomplished by driving the motor unit 26 in the reverse direction. Additionally, a limit switch may be provided on both sides of the holder to detect the above described lateral movement of the pedal arm 18 to restrict the magnitude of movement thereof.

Figure 4:
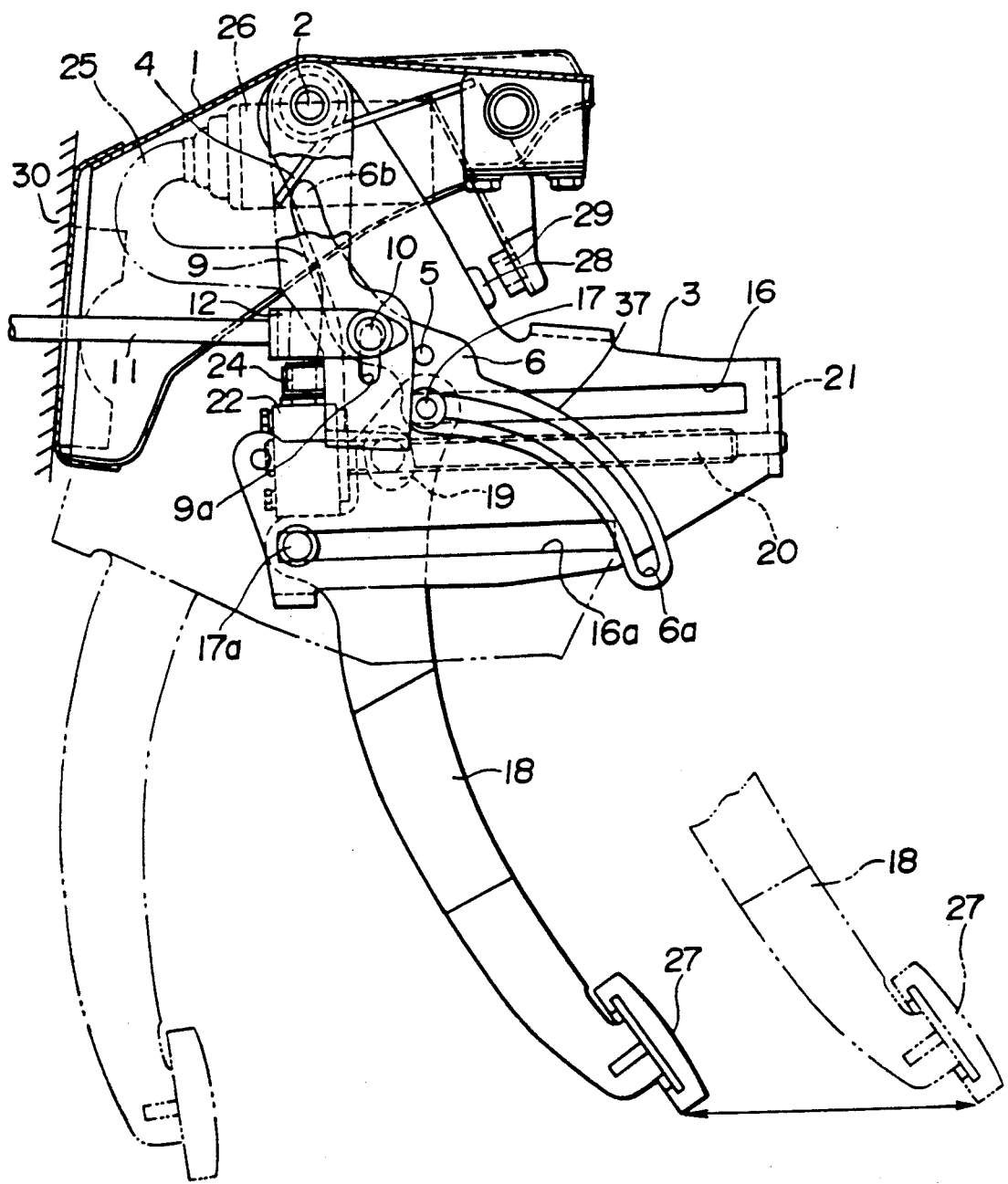
FIG. 4 is a cross sectional view which shows a second embodiment of an adjustable pedal of the invention in an adjusted position in solid lines and two other adjusted positions in broken lines.

Referring to FIG. 4, an alternate embodiment according to the invention is shown. This embodiment is different from the above embodiment in that an extending portion 6b is integrally formed on an end of an adjusting lever 6 to contact with an end of a return spring 4 which urges a holder 3 to rotate. Therefore, the return spring 4 serves to urge the adjusting lever 6 to rotate in place of a tension spring 15 provided in the first embodiment. As a result, number of parts can be decreased.

Figure 5:
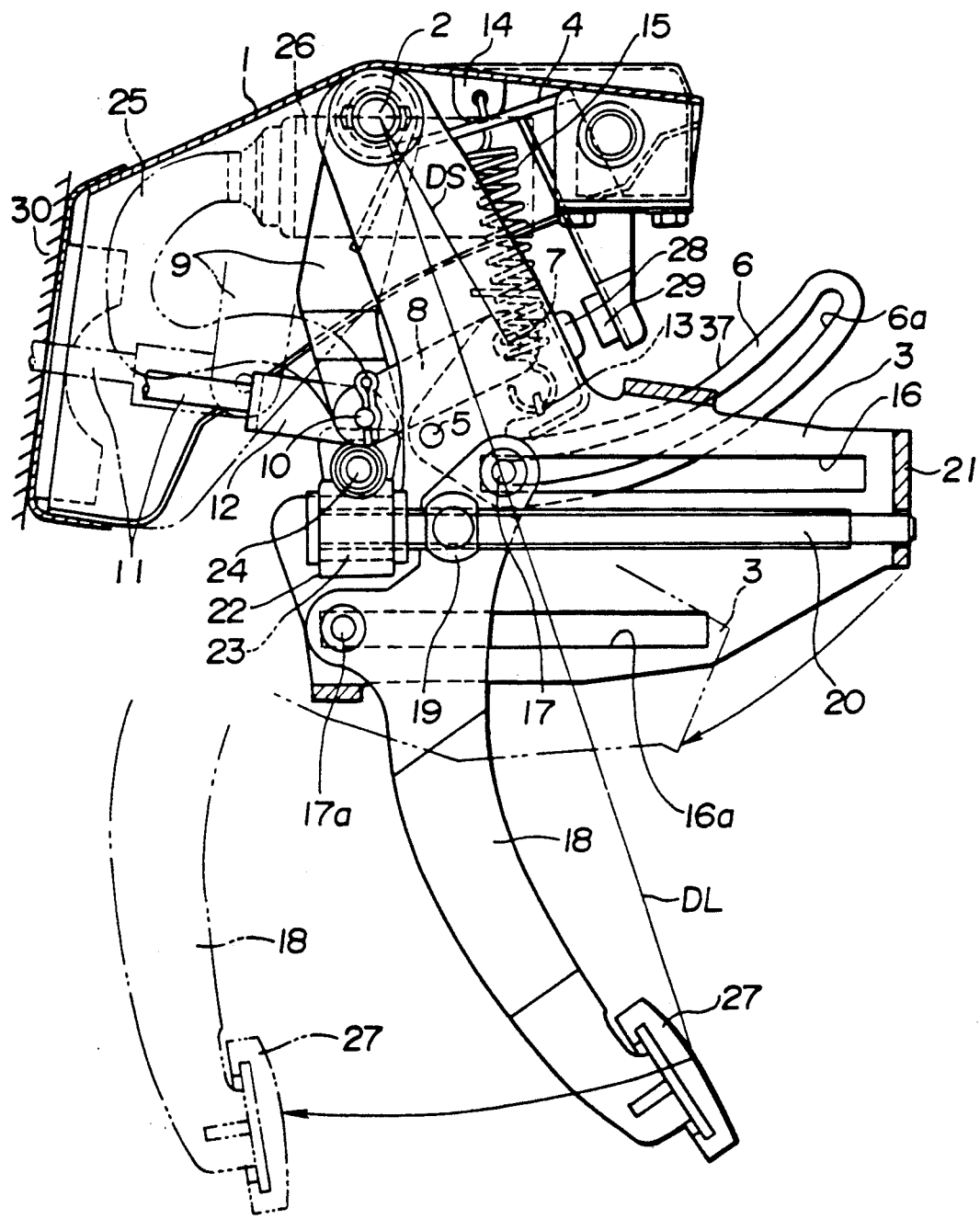
FIG. 5 is a cross sectional view taken through line 5—5 of FIG. 6 which shows a third embodiment of the invention and which shows the brake pedal in an adjusted position in solid lines and in another adjusted position in broken lines.

Referring to FIG. 5, a third embodiment of a brake pedal according to the present invention is shown. Structures of this embodiment which are substantially the same as that of the above embodiment will not be described in detail.

In this embodiment, an adjusting lever 6 is symmetrical to the first embodiment in geometry and curves upward. A movable lever 9 provides a linkage in cooperation with a link 8 an end of which is pivotably connected to the adjusting lever 6 through a shaft 7.

Figure 6:
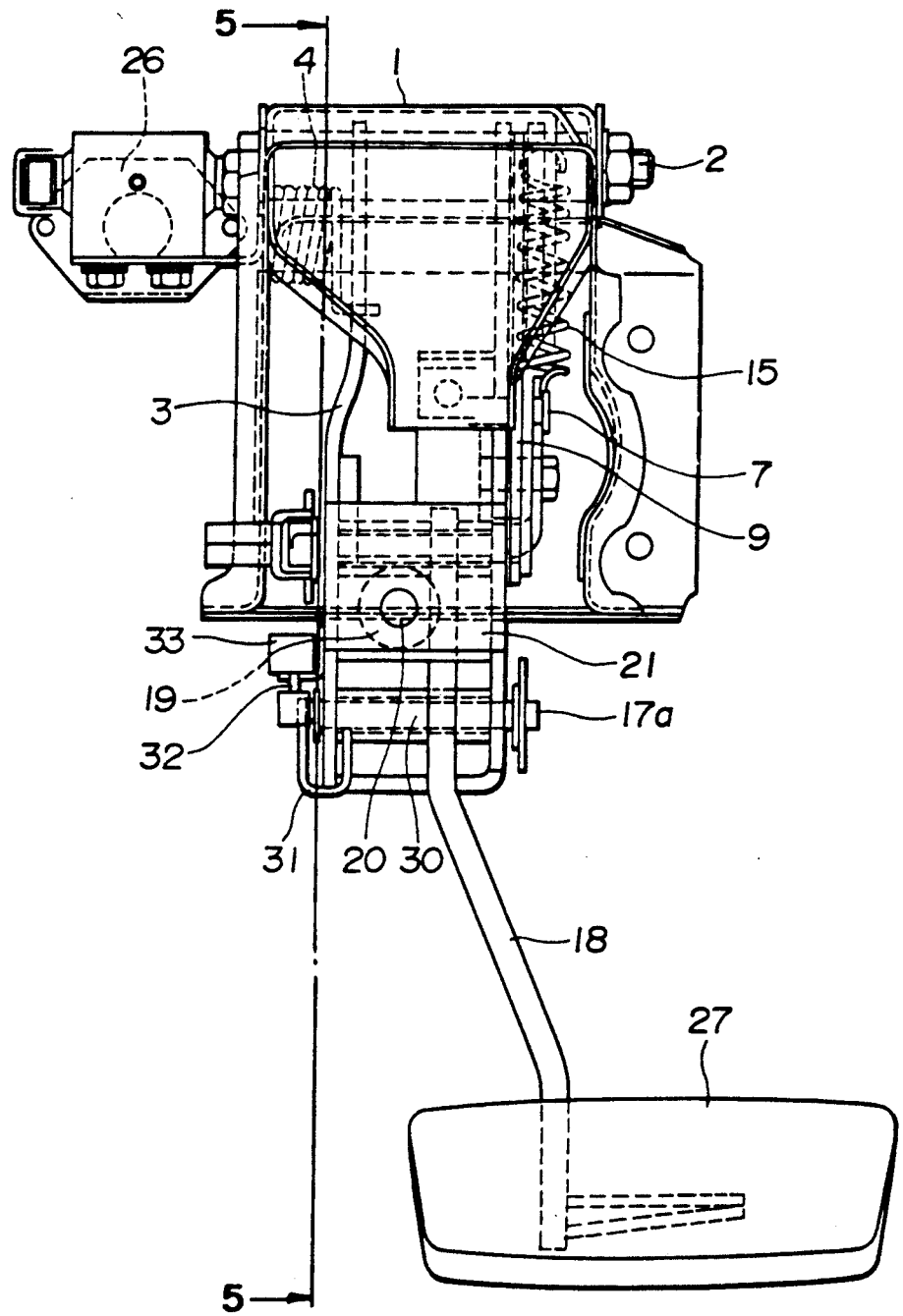
FIG. 6 is a front view of an adjustable pedal according to the present invention.

Referring to FIG. 6, a U-shaped arm 31 is attached to a collar 30 into which a pin 17a is inserted to support a pedal arm 18 so as to allow it to slide horizontally along an elongated opening 16a. The arm 31 extends over a holder 3 to be connected to a potentiometer 32 via a movable lever 32. The potentiometer 32 is installed on a side of the holder 3 which extends along the elongated openings 16 and 16a. The movable lever is slidable on the potentiometer 32 according to sliding movement of the pedal arm to provide a signal indicative of a pedal arm position to a controller (not shown). By utilizing the controller, having a microcomputer for example, to memorize optimum positions for a plurality of drivers, a motor unit 26 is stopped automatically when the pedal arm reaches a preselected position for adjusting a traveling distance thereof to provide the best driving position for a particular driver.

Figure 7:
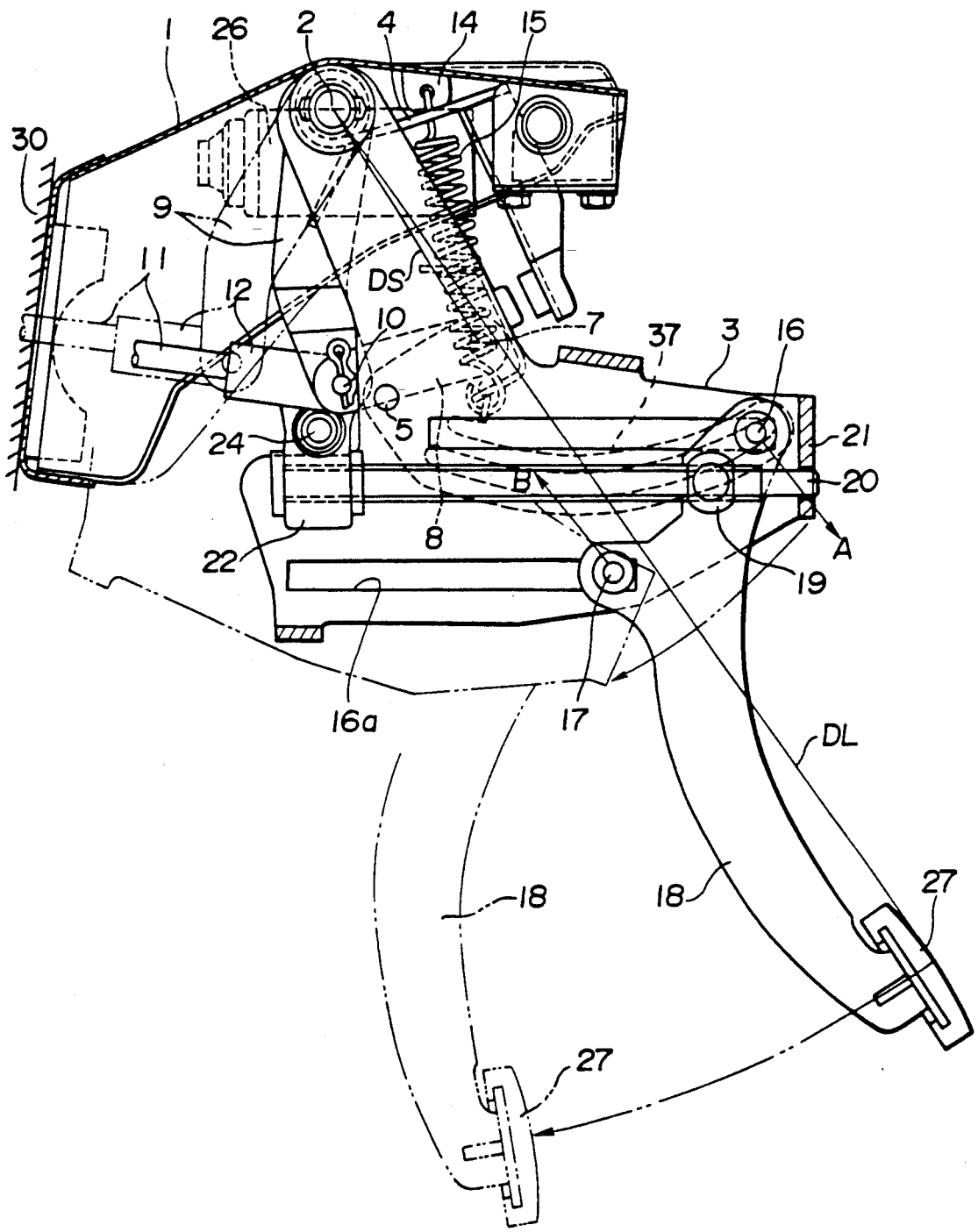
FIG. 7 is a cross sectional view similar to FIG. 5 which shows positional adjustment of an adjustable pedal of the invention in an adjusted position in solid lines and in another adjusted position in broken lines.

In operation, horizontal movement of the pedal arm 18 along the openings 16 and 16a as shown by a solid line in FIG. 7 causes the adjusting lever 6 to pivot about the shaft 5 in a clockwise direction with rotation of the movable lever 9 and the link 8 about a shaft 2 in a counterclockwise direction, an operating rod 11 thereby traveling from a broken line position to a solid line position. Similar to the first embodiment, a distance DS between the shaft 2 and the shaft 7 varies proportionally to a distance DL between the shaft 2 and the center of the pedal pad 27 with the constant ratio of the variation in the distance DS to that in the distance DL. It will be appreciated that the leverage of the pedal arm 18 is constant.

While the present invention has been disclosed in terms of the preferred embodiment in order to facilitate better understanding thereof, it should be appreciated that the invention can be embodied in various ways without departing from the principle thereof. For example, although the preferred embodiment is described in terms of a brake pedal, the present invention is also applicable to a clutch, accelerator or other type of pedal. In addition, although the embodiment is described in terms of a foot operated automotive pedal, the present invention may further be applied to all manner of lever-movement type members for which positional adjustment is desirable, for example, wheelchairs or other equipment for the handicapped, or in aviation or aerospace applications. Therefore, the invention should be understood to include all possible embodiments and modifications to shown embodiments which can be embodied without departing from the principle of the invention as set out in the appended claims.

What is claimed is:

1. A position adjustable pedal assembly for a vehicle comprising:

a bracket fixed to a stationary portion of the vehicle;

a holder attached to said bracket for a pivotal movement relative to said bracket with respect to a first pivotal axis, said holder including first and second linear paths of travel which extend in a longitudinal direction of the vehicle with a given interval therebetween;

a pedal arm with a pedal pad at its lower end, said pedal arm being engaged with the first and second paths of travel of said holder via first and second connecting members respectively for allowing linear movement along the first and second paths of travel, pivotally and longitudinally moving along with said holder in response to a depression force applied to the pedal pad;

pedal position adjusting means including a drive member and a driven member, the drive member adapted to be activated by a vehicle driver, said driven member mounted on said pedal arm to be selectively driven by said drive member to move said pedal arm along the first and second paths of travel of said holder for adjusting a position of the pedal pad in the longitudinal direction;

an adjusting lever provided on said holder for pivotal movement relative to said holder with respect to a second pivotal axis, said adjusting lever including a curved path of travel which engages with the first connecting member to allow the first connecting member to move along the curved path of travel with linear movement along the first path to travel of said holder for providing pivotal movement to said adjusting lever relative to said holder;

an operating member connected to said adjusting lever through a second pivotal axis for pivotal movement relative to said adjusting lever so that a distance between the first pivotal axis and the second pivotal axis varies according to variation in a distance between the first pivotal axis and the pedal pad in response to the linear movement of said pedal arm along the first and secnd linear paths of travel at a constant ratio, said operating member receiving the depression force applied to the pedal pad through said adjusting lever to output same; and a movable lever, connected to said bracket through the first pivotal axis, including a path of travel for receiving the second pivotal axis connecting between said adjusting member and said operating member for allowing pivotal movement of said adjusting lever relative to said holder within a range defined by said path of travel.

2. A position adjustable pedal assembly as set forth in claim 1, wherein said drive member includes a screw rod rotatably supported on said holder and extending in parallel to said first and second linear paths of travel, said driven member including a nut fixed to said pedal arm and havign a threaded hole therethrough which receives said screw rod therethrough for mutual engagement therebetween, said nut being allowed to move in the longitudinal direction of the vehicle along with said pedal arm when said screw rod is actuated to rotated.

3. A position adjustable pedal assembly as set forth in claim 1, wherein said first and second linear paths of travel are provided with first and second elongated openings formed in said holder, said first and second connecting members being provided with first and second pins to slide within the first and second elongated openings in response to linear movement of the pedal arm relative to said holder.

4. A position adjustable pedal assembly as set forth in claim 1, wherein the curved path of travel of said adjusting lever includes a curved opening having radii which are preselected to maintain a ratio of the distance between said first pivotal axis and said pedal pad to the distance between said first pivotal axis and the second pivotal axis at a constant value irrespective of a position of said pedal arm relative to said holder.

5. A position adjustable pedal assembly as set forth in claim 1, further comprising spring means associated with said first pivotal axis for biasing said holder toward a preselected initial position, said adjusting lever including first and second extending portions which extend in opposite directions about the second pivotal axis, the first extending portion having a curved path of travel and the second extending portion contacting said spring means to urge said adjusting lever to rotate in a preselected direction.

6. A position adjustable pedal assembly as set forth in claim 5, wherein said spring means includes a first spring provided on said pivotal axis to bias said holder toward said preselected initial position and a second spring contacting with said second extending portion of said adjusting lever to urge said adjusting lever to rotate in said preselected direction.

* * * * *